F. W. POWERS.
TEMPERATURE CONTROL VALVE.
APPLICATION FILED AUG. 29, 1914.
1,217,344.
Patented Feb. 27, 1917.
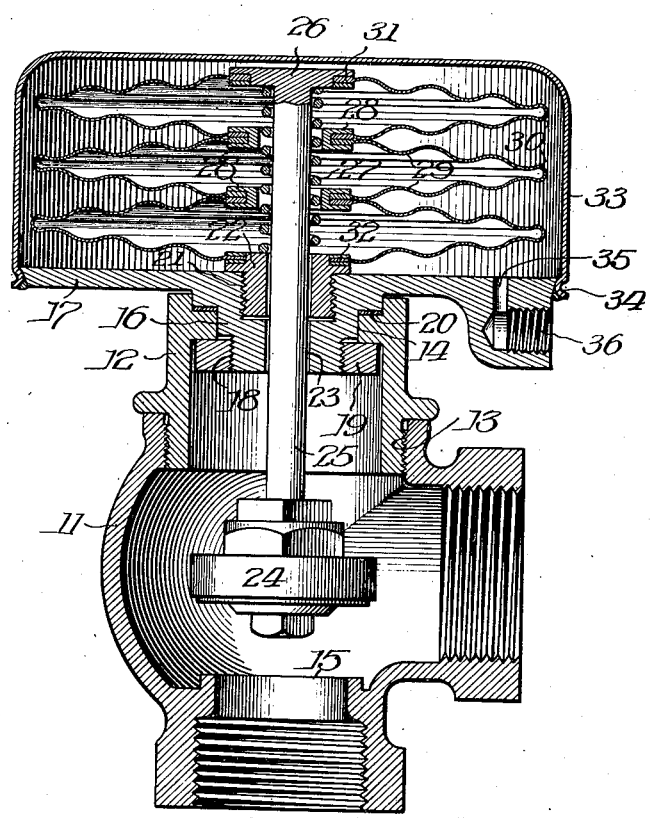
Witnesses:
Inventor
Fred W. Powers
By C. C. Linthicum
Atty.

UNITED STATES PATENT OFFICE.

FRED W. POWERS, OF CHICAGO, ILLINOIS, ASSIGNOR TO THE POWERS REGULATOR COMPANY, OF CHICAGO, ILLINOIS, A CORPORATION OF ILLINOIS.

TEMPERATURE-CONTROL VALVE.

1,217,344.  Specification of Letters Patent.  Patented Feb. 27, 1917.

Application filed August 29, 1914. Serial No. 859,151.

*To all whom it may concern:*

Be it known that I, FRED W. POWERS, a citizen of the United States, residing at Chicago, in the county of Cook and State of Illinois, have invented certain new and useful Improvements in Temperature-Control Valves, of which the following is a specification.

The invention has for its object a valve of the class indicated combining simplicity of construction and efficiency of operation. Characteristic features of the invention are the absence of stuffing boxes, packing, rubber or other packing material between the moving parts, which is subject to speedy deterioration, and substantial freedom from friction due to the loose guiding of the moving parts; also the adaptability of the valve to various positions and to changed working conditions such as increase in steam pressure during cold weather, and the like.

In order that the invention may be readily understood a preferred embodiment of the same is set forth in vertical longitudinal section in the accompanying drawing, and in the detailed description based thereon. As, however, the invention is susceptible of embodiment in other and varied constructional forms the drawing and description are to be taken in an illustrative and not in an unnecessarily limiting sense.

As illustrated, the valve casing is indicated at 11 and the bonnet at 12, the two parts being separably connected by a threaded joint at 13 in order to provide for the removal of the bonnet to give access to the interior for cleaning and adjustment, the upper portion of the valve bonnet 12 is provided with an opening 14 which is in vertical alinement with the port 15 and within this opening is fitted the boss 16 of a cap plate 17 to provide a tight joint. The lower portion of the boss is screw threaded at 18 to receive a lock nut 19 by means of which the cap plate and bonnet may be drawn snugly together upon the gasket 20. The cap plate has a central threaded aperture 21 to receive an exteriorly threaded bushing 22 thus forming of the bonnet and cap plate in effect a portion of the valve casing and providing a central bore 23. Within the valve casing is mounted a valve 24 and the stem 25 thereof is guided loosely within the bore 23 and is provided with a terminal head 26. The valve is normally held in its open position by means of the valve constraining spring 27 disposed about the valve stem between the bushing 22 and the head 26. The valve stem and spring are loosely encircled by a plurality of washers 28, 28, which washers are provided with peripheral grooves or recesses adapted to receive and securely hold the edges of the respective folds 29 of the accordion diaphragm 30 while the extremities 31 and 32 of said diaphragm are securely clamped within similar peripheral grooves of the head and bushing respectively. A housing 33 is arranged about the diaphragm and securely connected at 34 to the cap plate of the casing. At 35 is shown a pressure fluid inlet to the housing exterior to the diaphragm, the supply pressure fluid being controlled in known manner by a thermostatic device not shown.

It is thought the operation of the device will be apparent from the foregoing description. The thermostatically controlled admission of pressure fluid to the housing will act upon the several folds of the diaphragm to overcome the tension of the spring 27 and force the valve 24 toward its seat in a manner well known in devices of this character, the accordion fold construction of the diaphragm increasing its effective area in rendering the valve peculiarly sensitive. The loose fit of the valve stem within the bore 23 substantially eliminates friction in the operation of the valve, this loose fit being rendered possible by the hermetic sealing of the diaphragm and operating mechanism within the housing 33. The loose guiding of the stem within the bore also provides for intercommunication between the interiors of the valve casing and diaphragm whereby the pressure within the diaphragm is the same as that within the valve casing. Thus, when, as in cold weather, the steam pressure within the valve casing increases, the tendency will be to expand the diaphragm increasing the opening through the valve to compensate for the change in working conditions. Obviously the bushing 22 may be dispensed with, the valve stem being guided directly within the wall of the casing and if found desirable other provision than the loose fit of the stem may be made for communication between the interior of the valve casing and diaphragm as by special apertures other than or in addition to the space about the stem.

The object of the tight joint at 14 between the bonnet 12 and the boss 16 is to enable the cap plate to be rotated upon the other portions of the valve casing so as to bring the coupling at 36 for the thermostat to a position out of the way, preferably to the rear, regardless of the positioning of the lower part of the casing to accommodate the piping of the system. Obviously, this capacity for rotation of the valve casing parts may be dispensed with if desired.

Thermostats of the so-called graduated type which afford fluid pressure proportional to the temperature to which they are exposed will when controlling heat systems by means of a diaphragm motor of the spring tension type, carry a somewhat lower temperature in severe weather than they will in mild. This because the thermostat at a temperature of 70° will deliver pressure to the diaphragm motor sufficient to restrict to a certain point the opening through which the heating medium passes, and this opening which may be sufficient in mild weather to pass enough of the heating medium to maintain a room temperature of 70° will not be sufficiently large to do this in extremely cold weather, with the result that the temperature at the thermostat will fall slightly and the diaphragm motor open the valve proportionately with the result of carrying a somewhat lower temperature.

Heating plants make a practice of carrying a higher pressure in severely cold than in mild weather and, with this improved type of valve, this higher pressure by reaching the interior of the metal diaphragm exercises an expanding pressure therein in opposition to the collapsing pressure exerted by the thermostat on the outside of the diaphragm. This tends to resist the action of the thermostat with the result that the valve is not so nearly closed for a given room temperature under this high pressure condition and consequently affords passage to a greater amount of the heating medium, thus counteracting the tendency above referred to. Of course too great a tendency in this direction is corrected by the rise in the room temperature which will take place and cause the thermostat to exert a greater collapsing or closing pressure on the diaphragm and its valve.

Another feature of this valve is its peculiar adaptability to certain types of heating apparatus, known commonly as one-pipe steam systems, where the condensation from a radiator must return through the same valve opening that admits the steam. It is essential that the valve used on this type of steam system shall work positively, i. e., it must complete its movement in either direction, because if it stops for any length of time in a partly open position the water of condensation will not drain rapidly from the radiator and the steam coming in contact with it will cause objectionable noise.

It will be observed that the steam enters this valve casing under the seat and obviously when the disk is seated there is no pressure on top of it and consequently no steam pressure inside of the diaphragm which would tend to expand and open the valve. When the valve does open, however, steam is admitted beyond the seat and is then free to pass up to the diaphragm where it will exert a pressure tending to open the valve still farther. Reversely, in closing, this pressure within the diaphragm disappears as soon as the valve is seated and the steam that is in the radiator condensed, and the disappearance of this pressure causes the external pressure on the diaphragm to seat the valve more firmly. It is obvious, therefore that when used on this type of heating system and controlled positively, its peculiar construction insures the completion of each closing or opening movement.

I claim:

1. A temperature control valve comprising a valve casing having an apertured wall, a valve within the casing having its stem extending through the aperture and provided with a terminal head, a valve constraining spring disposed between the head and casing, a washer loosely encircling the stem, an accordion diaphragm inclosing the stem and having its extremities attached respectively to the head and casing and an intermediate fold attached to the washer, a housing about the diaphragm, and a pressure fluid inlet to the housing exterior to the diaphragm, provision being made for communication between the interiors of the valve casing and the diaphragm.

2. A temperature control valve comprising a valve casing having an apertured wall, a bushing seated therein, a valve within the casing having its stem loosely guided within the bushing and provided with a terminal head, a valve constraining spring disposed about the stem between the head and bushing, a plurality of washers loosely encircling the stem, an accordion diaphragm inclosing the stem and having its extremities attached respectively to the head and bushing and its intermediate folds attached to the washers, a housing about the diaphragm, and a pressure fluid inlet to the housing exterior to the diaphragm, the loose fit of the stem within the bushing providing for communication between the interiors of the valve casing and the diaphragm.

In witness whereof I have hereunto signed my name in the presence of two subscribing witnesses.

FRED W. POWERS.

Witnesses:
F. A. GILLESPIE,
P. O. KODERISCH.